US005647016A

United States Patent [19]

Takeyama

[11] Patent Number: 5,647,016

[45] Date of Patent: Jul. 8, 1997

[54] MAN-MACHINE INTERFACE IN AEROSPACE CRAFT THAT PRODUCES A LOCALIZED SOUND IN RESPONSE TO THE DIRECTION OF A TARGET RELATIVE TO THE FACIAL DIRECTION OF A CREW

[76] Inventor: Motonari Takeyama, 12, Sumida-machi, 2-chome, Gifu-shi, Gifu 500, Japan

[21] Appl. No.: 511,994

[22] Filed: Aug. 7, 1995

[51] Int. Cl.⁶ ........ G06K 9/00

[52] U.S. Cl. ........ 382/103; 340/961; 364/460

[58] Field of Search ........ 382/103, 104, 382/106, 291; 348/116, 117, 123; 342/24; 434/38, 48, 49, 116; 340/825.49, 961, 971, 988; 364/424.06, 439, 460

[56] References Cited

U.S. PATENT DOCUMENTS

| | | | |
|---|---|---|---|
| 3,736,559 | 5/1973 | Trageser et al. | 340/27 R |
| 4,388,494 | 6/1983 | Schöne et al. | 179/1 G |
| 4,658,932 | 4/1987 | Billingsley | 181/175 |
| 4,692,763 | 9/1987 | Gregg, Jr. | 342/28 |
| 4,739,513 | 4/1988 | Kunugi et al. | 381/103 |
| 4,817,149 | 3/1989 | Myers | 381/1 |
| 5,138,555 | 8/1992 | Albrecht | 364/424.06 |
| 5,187,692 | 2/1993 | Haneda et al. | 367/135 |
| 5,222,059 | 6/1993 | Holman | 369/89 |
| 5,313,201 | 5/1994 | Ryan | 340/961 |
| 5,325,436 | 6/1994 | Soli et al. | 381/68 |
| 5,333,200 | 7/1994 | Cooper et al. | 381/1 |
| 5,371,799 | 12/1994 | Lowe et al. | 381/25 |
| 5,508,699 | 4/1996 | Silverman | 340/944 |

*Primary Examiner*—Andrew Johns

[57] ABSTRACT

The direction of a target is determined relative to the facial direction of a crew of an aerospace craft and a localized sound is produced in this direction. This localized sound is then output binaurally to the crew to provide an indication of the location of the target. This use of localized sound allows the crew to rapidly locate targets while reducing eye strain. Pseudo-targets can also be located in a flight simulator.

31 Claims, 6 Drawing Sheets

MAN-MACHINE INTERFACE IN AEROSPACE CRAFT THAT PRODUCES A LOCALIZED SOUND IN RESPONSE TO THE DIRECTION OF A TARGET RELATIVE TO THE FACIAL DIRECTION OF A CREW

BACKGROUND OF THE INVENTION

1. Field of the Invention

This invention relates to a man-machine interface which may be utilized to convey a direction of a detected target to a crew of an aerospace craft or a flight simulator, but it will be appreciated that this invention is also useful in other applications.

2. Description of the Prior Art

As a means of conveying detected information to a crew of an aerospace craft, displays have been often used. A CRT(Cathode-Ray Tube) is usually incorporated in a display and the detected information is shown on the CRT to the crew. Also, in aircraft which need to move vigorously, a HUD(Head Up Display) or a HMD(Head Mounted Display) has been used to present the detected information so that a pilot can get the information while looking ahead.

Detectors utilizing radar, infrared or laser aid crew in visual recognition. For instance, the crew can recognize targets in the distance which are invisible to the naked eye. The detectors can locate targets even under low visibility due to rain or cloud and check behind and to the sides where the crew can not look. One example making good use of such detectors is the F-15E fighter of the US Air Force. The F-15E fighters are usually fitted with LANTIRN(Low Altitude Navigation and Targeting Infrared for Night) pods in addition to radar. The LANTIRN pods include various sensors such as FLIR(Forward Looking Infrared) system, TFR(Terrain Following Radar), LTD(Laser Target Designator). Information about distance to target, azimuth angle and elevation angle captured by the sensors is displayed on the HUD situated in front of the crew. Thus, the crew can obtain information captured by the detectors via display as well as recognize targets by the unaided eye. However in either case, the crew obtains the information by visual perception. Though an audible alert is often used to inform the crew of the detected information, it is used mainly to call the crew's attention to an instrument panel or a display. Accordingly, the crew's eyes are always under a lot of stress.

Then, a known technology regarding sound, more specifically, binaural sound localization is explained as follows: binaural listening means listening by both ears and it is a usual situation in which we hear sound around us. We perceive the direction of and distance to a sound source binaurally and it is called sound localization. The theory and technology of binaural sound localization may be found in the literature, "Application of Binaural Technology" written by H. W. Gierlich in Applied Acoustics 36, pp.219–243, 1992, Elsevier Science Publishers Ltd, England; "Headphone Simulation of Free-Field Listening I: Stimulus Synthesis" by F. L. Wightman and D. J. Kistler in J. Acoust. Soc. Amer., Vol.85, pp.858–867, 1989; and "Headphone Simulation of Free-Field Listening II: Psychophysical Validation" by F. L. Wightman and D. J. Kistler in J. Acoust. Soc. Amer., Vol.85, pp.868–878, 1989. Furthermore, "Process and apparatus for improved dummy head stereophonic" by Peter Sch öne, et al, U.S. Pat. No. 4,388,494; "Three-dimensional auditory display apparatus and method utilizing enhanced bionic emulation of human binaural sound localization" by Peter Myers, U.S. Pat. No. 4,817,149; and "Surround-sound system with motion picture soundtrack timbre correction, surround sound channel timbre correction, defined loudspeaker directionality, and reduced comb-filter effects" by Tomlinson Holman, U.S. Pat. No. 5,222,059 have disclosed the technology. Thus, binaural sound localization is a technique for duplicating a more realistic sound in the audio industry. Still further, "Binaural Doppler radar target detector" by Ralph Gregg, Jr., U.S. Pat. No. 4,692,763 is related to a radar target detector and binaural technology.

SUMMARY OF THE INVENTION

It is an object of the invention to provide a man-machine interface which enables the crew of an aerospace craft to perceive a direction of a detected target aurally.

It is another object of the invention to provide a man-machine interface which enables the crew of a flight simulator to perceive a direction of a detected pseud-target aurally.

In the invention, the man-machine interface in the aerospace craft conveys the direction of the detected target to the crew of the aerospace craft by a localized sound comprising the steps of:

- obtaining the direction of the detected target;
- detecting a crew's facial direction;
- calculating a direction of the detected target with respect to the crew's facial direction from the direction of the detected target and the crew's facial direction;
- producing the localized sound by localizing a sound used as a sound source in the direction of the detected target with respect to the crew's facial direction; and
- outputting the localized sound binaurally to the crew by a sound-output device.

Alternatively, in the invention, the man-machine interface in the flight simulator conveys the direction of the detected pseud-target to the crew of the flight simulator by a localized sound comprising the steps of:

- obtaining the direction of the detected pseud-target;
- detecting a crew's facial direction;
- calculating a direction of the detected pseud-target with respect to the crew's facial direction from the direction of the detected pseud-target and the crew's facial direction;
- producing the localized sound by localizing a sound used as a sound source in the direction of the detected pseud-target with respect to the crew's facial direction; and
- outputting the localized sound binaurally to the crew by a sound-output device.

DESCRIPTION OF THE PREFERRED EMBODIMENTS

In implementing this invention, the following patent literature on public view can prove that the technology illustrated in the invention is workable: "Stereo headphone sound source localization system" by Danny Lowe, et al, U.S. Pat. No. 5,371,799; "Simulated binaural recording system" by Michael Billingsley, U.S. Pat. No. 4,658,932; "Head diffraction compensated stereo system with loud speaker array" by Duane Cooper, et al, U.S. Pat. No. 5,333,200; "Method of signal processing for maintaining directional heating with hearing aids" by Sigfrid Soli, et al, U.S. Pat. No. 5,325,436; "Acoustic transfer function simulating method and simulator using the same" by Yoichi Haneda, et al, U.S. Pat No. 5,187,692; and "Method and apparatus for measuring and correcting acoustic" by Yoshiro Kunugi, et al, U.S. Pat. No. 4,739,513. These patents have disclosed particularly the technology of sound localization with the aid of head related transfer function and the technology of binaural recording and playback.

The constituents of the invention fall into the following broad parts:

- finding the direction of a detected target;
- detecting the crew's facial direction;
- calculating the direction of the detected target with respect to the crew's facial direction from the direction of the detected target and the crew's facial direction;
- localizing a sound used as a sound source in the direction of the detected target with respect to the crew's facial direction to produce the localized sound; and
- outputting the localized sound binaurally to the crew by a sound-output device.

Although each part can be embodied in various ways, the preferable embodiments are described as follows.

Figure 1:
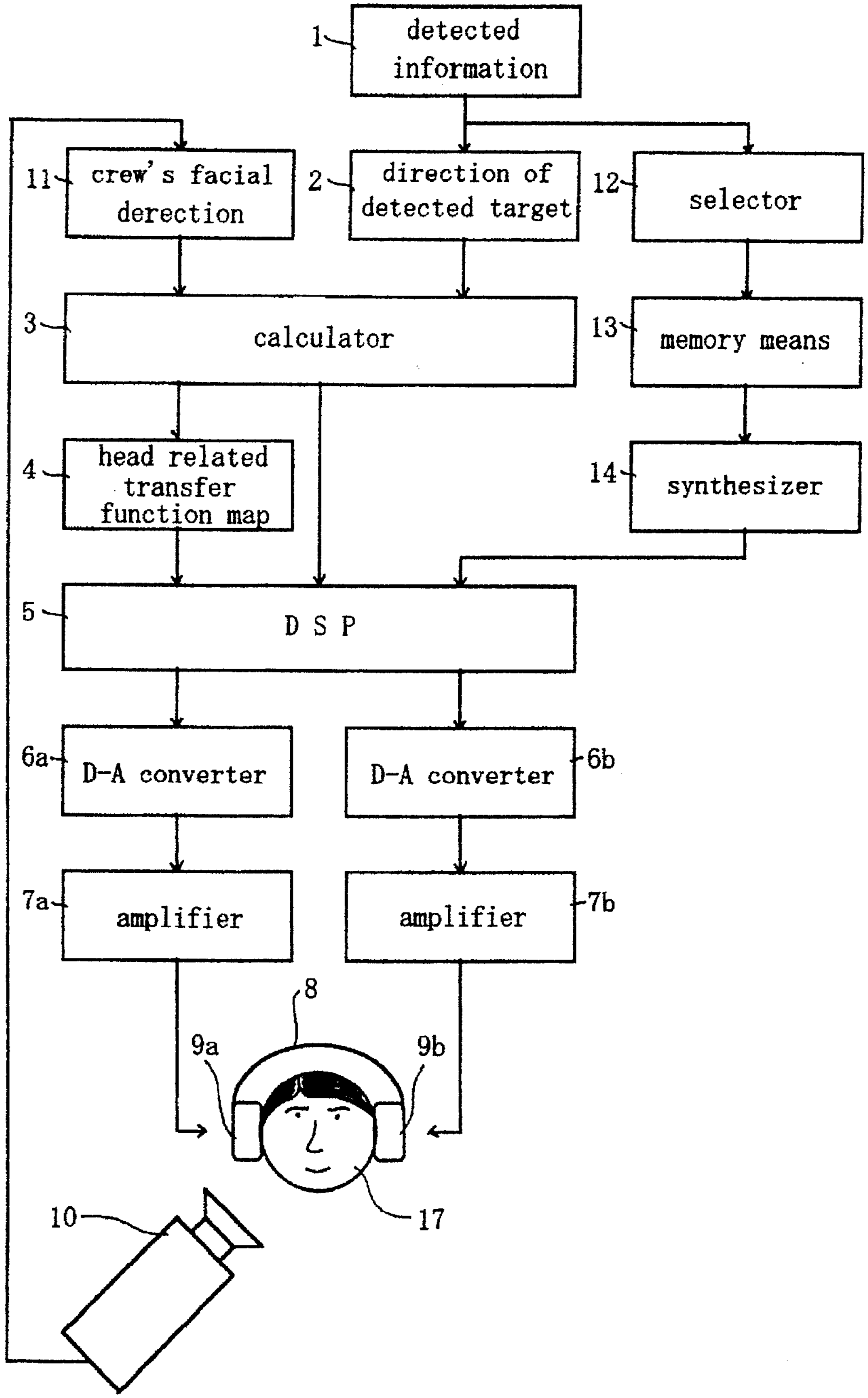
FIG. 1 shows a block diagram of one embodiment of the invention.

In FIG. 1, detected information 1 is information about detected targets. The targets to be detected vary. For instance, as regards civilian aircraft, a bad-weather zone should be found on and around its course and the aircraft needs to avoid the zone. A system such as ACAS(Airborne Collision Avoidance System) to detect an aircraft on a possible collision course and provide the crew with traffic advisory exists. On the other hand, as to military aircraft, the directions of friendly aircraft and foe aircraft should be indicated from one moment to the next to the crew and information about the direction of facilities on the ground or the sea may be necessary, depending on the purpose of the flight. Moreover, spacecraft need to determine the direction of an artificial satellite and an obstacle floating in outer space. Accordingly, the direction of detected target 2 is important information when an aerospace craft flies. While a direction is determined by an azimuth angle and an elevation angle, this invention needs at least an azimuth angle and if possible, both an azimuth angle and an elevation angle are considered, Then, if the distance from the aerospace craft to a detected target is measured, the location of the detected target can be tracked down. As a means for finding direction of detected target 2, a detector aboard an aerospace craft such as a radar detector, an infrared detector or a laser detector can be used according to a use environment. For cases where a radar is used, the direction of a detected target can be obtained by converting signals indicating the angle of a radar antenna with S-D (Synchro-Digital) converter or by checking the direction of radar beam scanning emerging from Phased Array Radar. In addition, it is known that the distance to a detected target can be measured with a radar detector. Generally, the direction of a detected target with respect to an aerospace craft heading is conveyed to the crew and the heading is obtained by detecting each angle of roll, pitch, and yaw with the gyroscope. As another means, a data link system can be used to acquire direction of detected target 2; that is to say, information captured by a ground-located detector, or a detector aboard a ship, an artificial satellite or another aerospace craft, not by a detector aboard the aerospace craft may be received via the data link system. As a result, the crew of the aerospace craft can know the direction of the detected target.

On the other hand, the direction in which crew 17 is facing can be found by various known means. As a means done by machine, a rotary encoder or a potentiometer is used.

Also, a magnetic sensor fixed to a head of the crew measures the strength of a magnetic field and the position of the head of the crew is determined. In this method, a sensor known by FASTRAK system ("FASTRAK" is the trademark) by Polhemus Inc. (U.S. corporation) has been used. In addition to the above methods, as another embodiment of this invention, TV camera 10 shoots the head of the crew and the crew's facial direction can be detected by performing image processing. The publicly known technology to detect the location of an object by carrying out image processing is practical in that the crew is on an aerospace craft and some airborne instruments are not immune to magnetic fields. In addition, the size of cockpit is suitable for carrying out image processing.

From the crew's facial direction 11 and the direction of detected target 2, the direction of the detected target with respect to the crew's facial direction is calculated with calculator 3. The direction of the detected target with respect to the aerospace craft heading needs to be converted to the direction of the detected target with respect to the crew's facial direction because the crew's facial direction and the aerospace craft heading might not be the same. In other words, the direction of the detected target with respect to the aerospace craft heading dose not always agree with that of the detected target with respect to the crew's facial direction.

Figure 3:
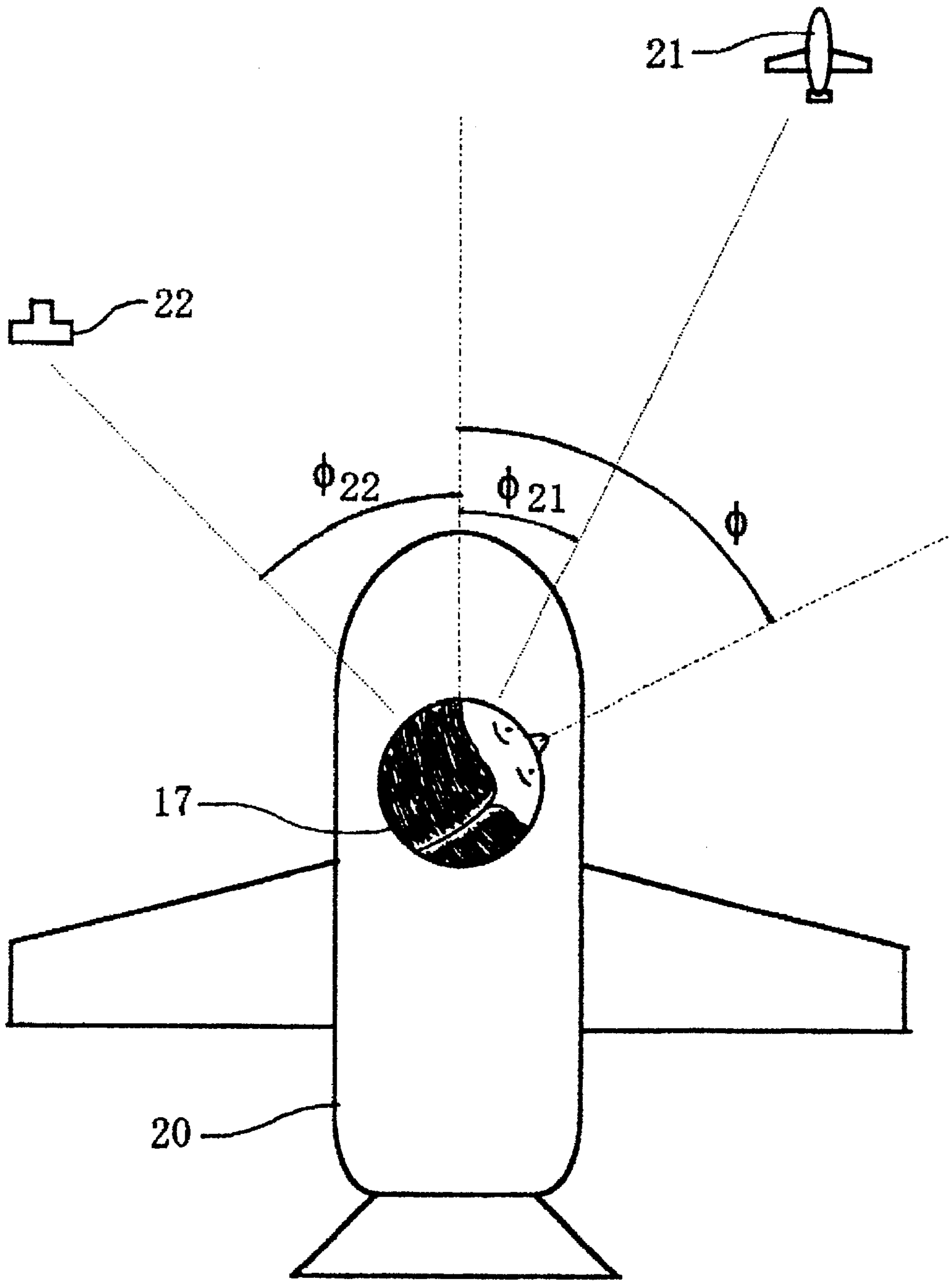
FIG. 3 is a reference drawing illustrating one embodiment of the invention.
Figure 4:
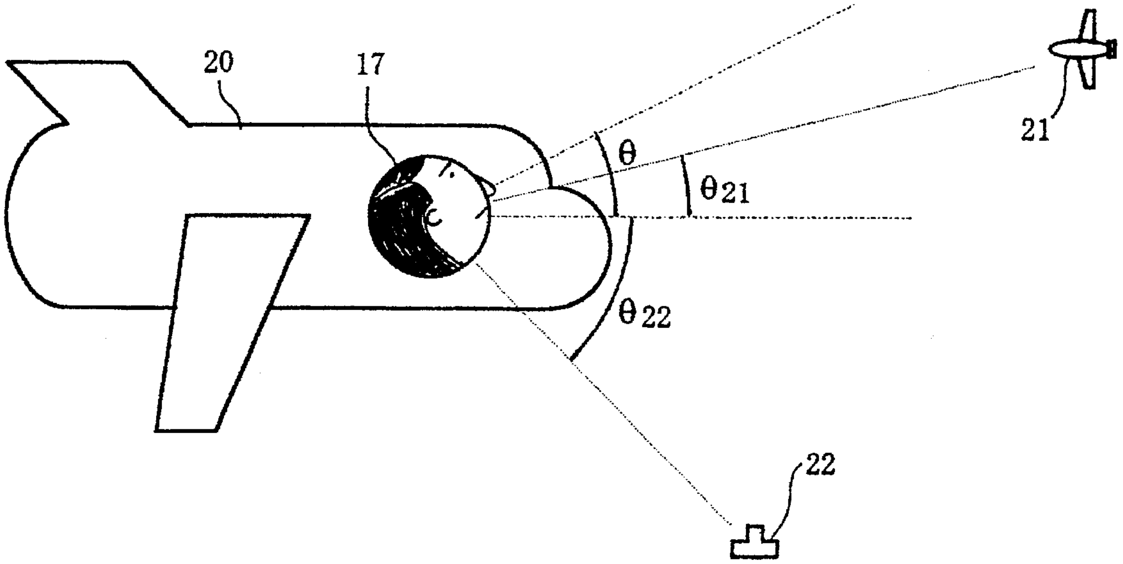
FIG. 4 is a reference drawing illustrating one embodiment of the invention.

Referring now to FIGS. 3 and 4, a little more details can be explained. As FIG. 3 shows, when detected target 21 is detected at an angle of $\phi$21 to the heading of aerospace craft 20 and another detected target 22 is detected at an angle of $\phi$22, if crew 17 of the aerospace craft is facing in the direction which forms an angle of $\phi$ with the aerospace craft heading, each direction of the detected target 21 and the detected target 22 with respect to the crew's facial direction can be given by the expressions, $\phi-\phi 21$ and $\phi+\phi 22$. Besides, as shown in FIG. 4, when detected target 21 is detected at an angle of $\theta$21 to the heading of aerospace craft 20 and another detected target 22 is detected at an angle of $\theta$22, if crew 17 of the aerospace craft is facing in the direction which forms an angle of $\theta$ with the aerospace craft heading, each direction of the detected target 21 and the detected target 22 with respect to the crew's facial direction can be taken by the expressions, $\theta-\theta 21$ and $\theta+\theta 22$. However, in the invention, when direction of detected target 2 dose not include target elevation angle and is determined only by target azimuth angle, the azimuth angle of a detected target with respect to the crew's facial direction should be determined on a level surface at the altitude of the aerospace craft.

A man-machine interface in this invention localizes a sound in the direction of a detected target with respect to the crew's facial direction and produces the localized sound. As one embodiment of the invention, sound localization can be performed so that the direction of a sound source may vary continuously proportionally to the amount of change in the direction of the detected target. If sound localization is performed as mentioned above, as the direction of the detected target changes, the direction of a sound source also changes smoothly. However, the resolution of human hearing for direction is very low compared to that of a detector used in the invention. Thus, as another embodiment of the invention, if the resolution for direction of the detected target with respect to the crew's facial direction is programmed at 30 degrees, the direction of the detected target can be perceived by sound localized in discontinuous direction. In this embodiment, the horizontal resolution for azimuth angle of a detected target with respect to the crew's facial direction programmed at 30 degrees or the resolution for both azimuth angle and elevation angle of a detected target with respect to the crew's facial direction programmed at 30 degrees can be chosen.

Figure 5:
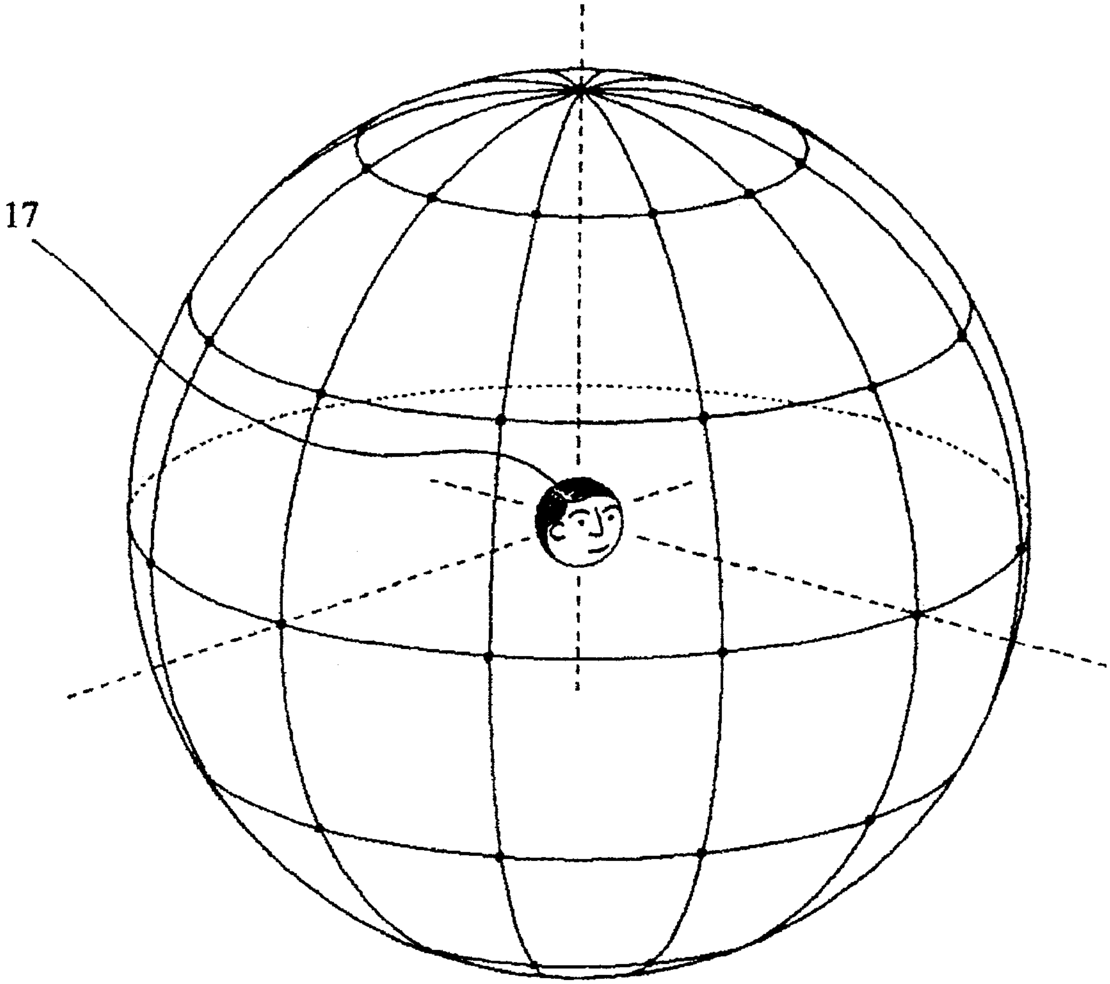
FIG. 5 is a reference drawing illustrating one embodiment of the invention.

FIG. 5 shows a three-dimensional view around crew 17. In case the direction of the detected target is determined only by the azimuth angle, regardless of the elevation angle, sound used as a sound source is localized in the same plane or in two dimensions. The two-dimensional plane should be horizontal at the altitude of the aerospace craft, regardless of the crew's facial direction. If the horizontal resolution for the direction is programmed at 30 degrees, 12 different directions can be set in the same plane, centering the crew in the plane, which is convenient in that the azimuth angle is often compared to the face of a clock, and is described such as "2 o'clock position" in the field of aviation. Moreover, as shown in FIG. 5, when the direction of the detected target is determined not only by the azimuth angle but also by the elevation angle, if the resolution for the elevation angle is programmed at 30 degrees as well as that for the azimuth angle, 62 different directions can be set in the space, centering the crew in the space. If sound as a sound source is localized in the set directions, not in every direction, it can reduce the number of head related transfer functions and produce a great and practical effect on the aural perception for the direction of the detected target without burdening a processor and memory means.

Figure 6:
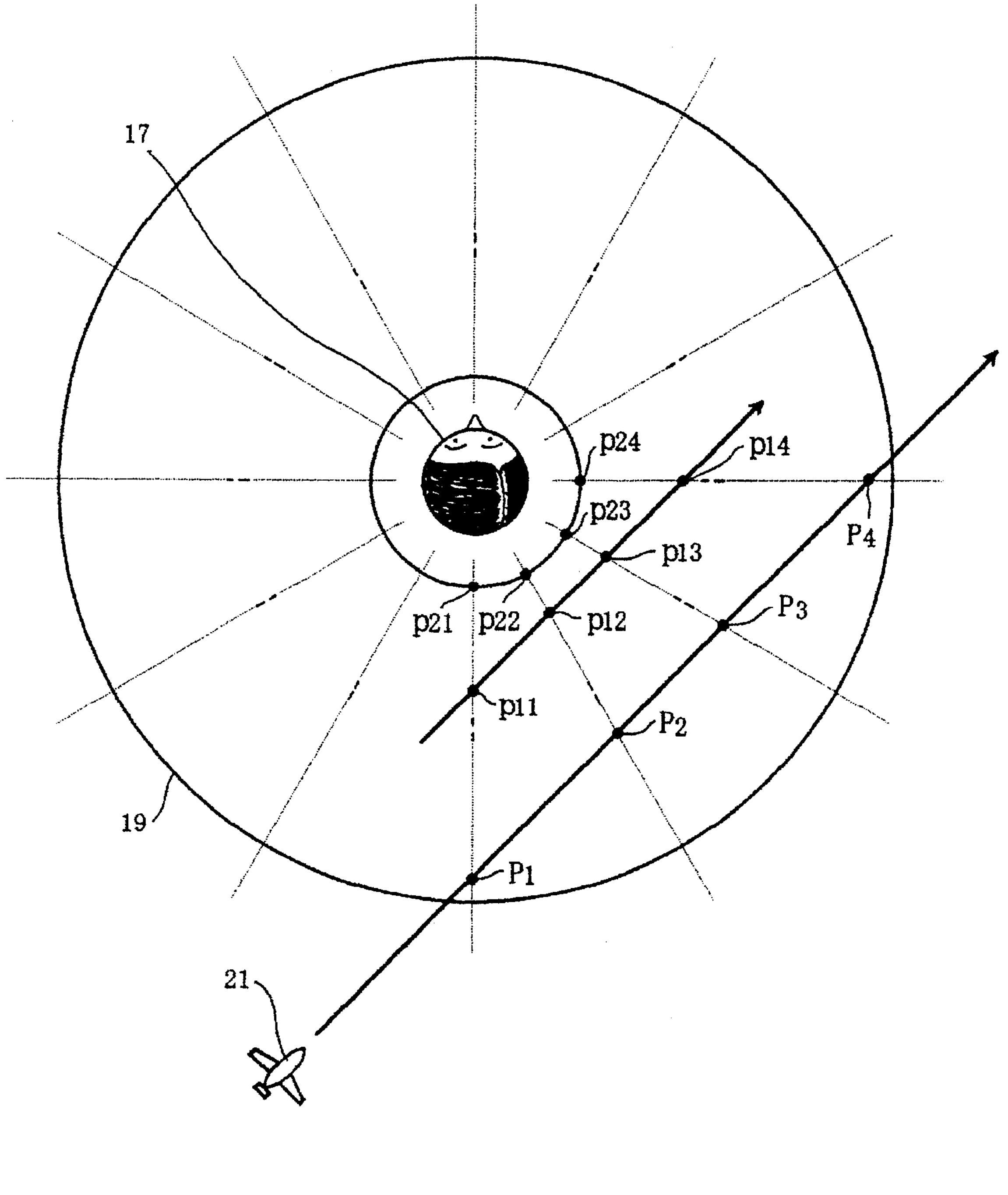
FIG. 6 is a reference drawing illustrating one embodiment of the invention.

When the detected information includes the distance from the aerospace craft to the detected target, if sound localization is performed in such a manner that reflects the distance, the distance can be perceived by a sense of hearing. However, it is not practical to localize a sound source at the actual distance, in an attempt to make the crew perceived aurally that the detected target is at a distance of 100 km from the aerospace craft. As an embodiment of the invention, a scaled-down distance is obtained by scaling down the distance from the aerospace craft to the detected target at between 1 to 10,000 and 1 to 1,000 and the sound used as the sound source is localized at the scaled-down distance from a head of the crew. In the invention, if the distance is scaled to 1 to 10,000, when a target is detected at a distance of 100 km and another target is found at a distance of 10 km, sound localization is performed at a distance of 10 m and 1 m from a head of the crew respectively. In FIG. 6, when detected target 21 flies through detectable scope 19 centered on aerospace craft carrying crew 17, if the direction of the detected target at each point, P1, P2, P3 and P4 detected target 21 passes by is conveyed to the crew by a localized sound, the crew is able to perceive the change in the distance to the detected target aurally, by scaling down the distance from the aerospace craft to each point at between 1 to 10,000 and 1 to 1,000 and localizing the sound used as the sound source at the scaled-down distance, p11, p12, p13 and p14 from the head of the crew. However, since the intensity of sound decreases proportionate to the second power of distance, it is difficult to make the crew perceived the change in the distance to the target in a wide range by outputting an appropriate intensity of sound. It is also not preferable to listen attentively to perceive an attenuated sound in a high-noise environment such as in an aerospace craft. For this reason, in another embodiment of the invention as a more effective way, sound localization is performed at a certain distance of between 10 cm and 10 m, preferably between 50 cm and 5 m from the crew, regardless of the distance to the detected target. As shown in FIG. 6, when detected target 21 flies through detectable scope 19 centered on an aerospace craft carrying crew 17, in an attempt to convey the direction of the detected target at each point, P1, P2, P3 and P4 that the detected target passes by to the crew by a localized sound, if sound localization is performed at a certain distance from the head of the crew, p21, p22, p23 and p24, regardless of the distance to the detected target, the crew is not able to perceive the distance, but is able to perceive the direction of the detected target by a certain appropriate intensity of sound.

In addition, as show in FIG. 1, various kinds of sound can be used as a sound source according to the contents of detected information 1. If the type of the detected target is included as information, voice message which contains the information can be used as a sound source. Then, as stated above, if the sound used as the sound source is localized at the certain distance, regardless of the distance to the detected target, the information about the distance to the detected target can be also provided as a voice message. These functions are made possible by using a publicly known voice synthesis technique. Depending on the contents of detected information 1, the kind of a sound source can be chosen by selector 12. In one embodiment of the invention, after voice message data stored in memory means 13 are designated by selector 12 according to detected information 1, the voice message data are synthesized with synthesizer 14 in order to produce the sound used as the sound source. As another embodiment, a beep as a caution or a warning can be utilized as a sound source. In this case, instead of the electric circuit that carries out voice synthesis which is shown in FIG. 1, the electric circuit that produces a beep is used to synthesize sound as the sound source.

After performing the above steps, a head related transfer function is selected from head ralated transfer function map 4, according to the direction of the detected target with respect to the crew's facial direction calculated by calculator 3 and the sound as the sound source is localized with DSP(Digital Signal Processor) 5 in order to produce the localized sound. Signal processing is carded out on the localized sound with D-A(Digital-Analog) converter **6*a* and 6*b*, and amplifier 7*a* and 7*b* to output binaurally from right and left speakers 9*a* and 9*b* of headphone 8 as sound-output device crew 17** is wearing.

Figure 2:
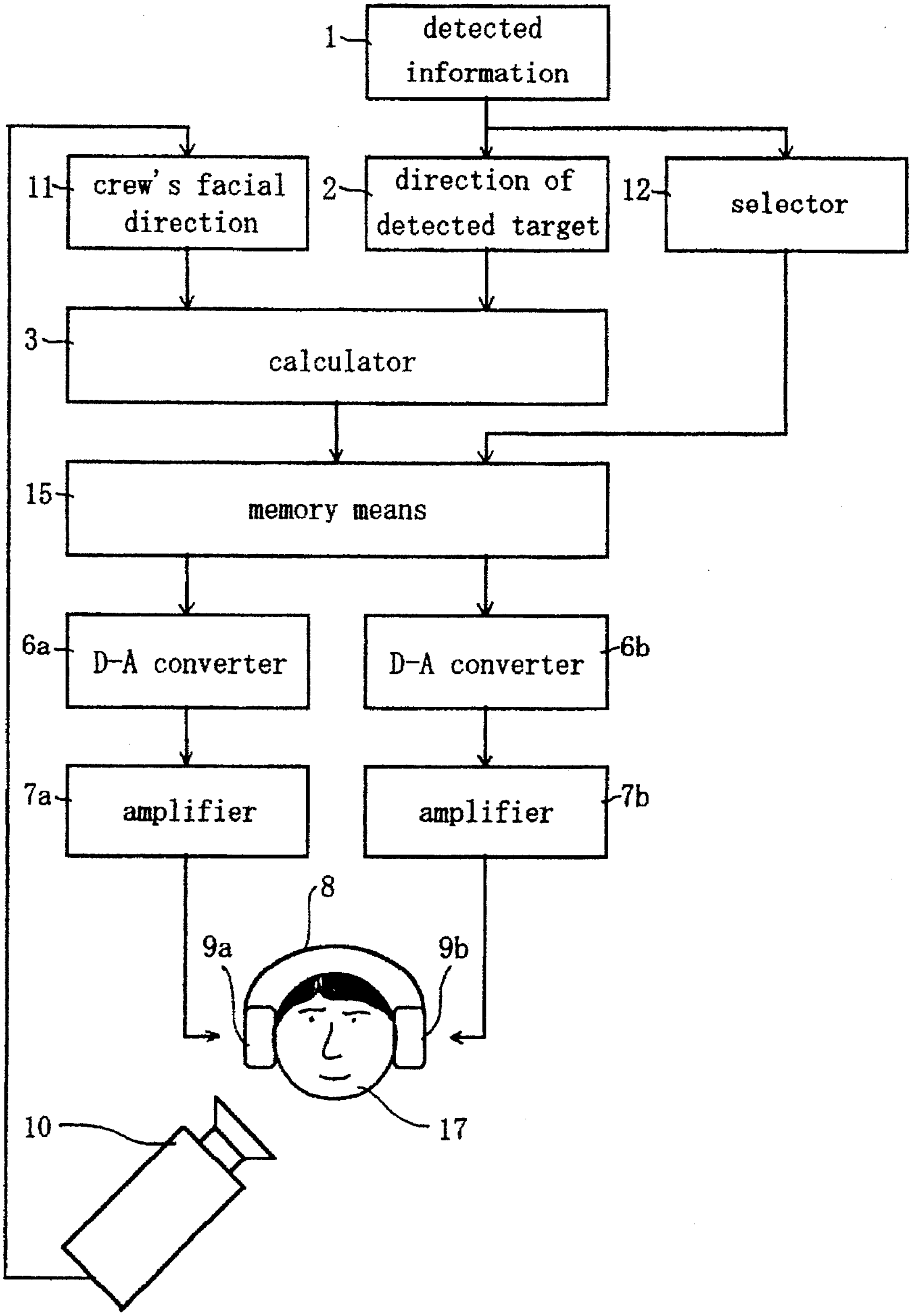
FIG. 2 shows a block diagram of another embodiment of the invention.

FIG. 2 shows another embodiment where sound localization is performed in the direction of the detected target with respect to the crew's facial direction and the localized sound is produced. The numerals and alphabets in FIGS. 1 and 2 denote the same functions. In this embodiment, sound as the sound source is localized in advance, in all directions that the resolution for direction of the detected target with respect to the crew's facial direction provides and then, the localized sound is produced and is stored in memory means 15. In this way, when the sound localized in advance is used to communicate information to the crew, the head related transfer function and DSP are unnecessary to replay the sound. In the embodiment FIG. 2 illustrates, the localized sound is read out from memory means 15 according to the direction of the detected target with respect to the crew's facial direction calculated by calculator 3, and after signal processing is carried out, the sound is output from sound-output device binaurally. The technology for localizing sound at a specific location and outputting the sound binaurally to listeners has been disclosed by the literatures mentioned already.

Another object of this invention is to provide a man-machine interface that enables the crew of a flight simulator to perceive the direction of a detected pseud-target aurally. The constituents of the invention to serve the object conform to the methods described earlier for conveying the direction of the detected target to the crew of the aerospace craft. Major uses of flight simulators are providing crew with training in maneuvering an aerospace craft and giving experience in an aerospace craft in the field of amusement. Consequently, in the invention, the difference between an aerospace craft and a flight simulator is that detected targets are real or unreal. Pseud-targets are generated electronically. In this embodiment of the invention, detected information 1 and direction of detected target 2 in FIGS. 1 and 2, and detected target 21 and 22 in FIGS. 3, 4 and 6 are imaginary pans. In addition, aerospace craft 20 carrying crew 17 is not a real craft but a flight simulator.

In general, in a flight simulator, since the noises or vibrations caused by the engine in a real aerospace craft can be eliminated, it is practical to use loudspeakers as devices for outputting localized sound in the invention. The technology to use loudspeakers as sound-output devices has been disclosed by the literatures mentioned above.

Embodiments disclosed here are some examples out of many to explain the invention. For instance, though DSP for use in signal processing is a processor mainly for calculating sound signal, MPU(Micro Processor Unit) for use in general calculating can be used to perform signal processing in stead of DSP. Then, as a substitute for ROM(Read Only Memory) or RAM(Random Access Memory) which is suitable for storing sound data as a memory means, a hard disc unit or an optical disc unit may be used if necessary, and moreover, in order to allow various expressions such as, "an angle of 270 degrees", "30 degrees right", "4 o'clock position" or "north-northeast" in explaining an azimuth angle, the scope of the invention should not be restricted by the words and expressions used to describe the embodiments of the invention. Besides, as this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A man-machine interface in an aerospace craft for conveying a direction of a detected target to a crew of the aerospace craft by a localized sound comprising the steps of:

(a) obtaining the direction of the detected target;

(b) detecting a crew's facial direction;

(c) calculating a direction of the detected target with respect to the crew's facial direction from the direction of the detected target and the crew's facial direction;

(d) producing the localized sound by localizing a sound used as a sound source in the direction of the detected target with respect to the crew's facial direction; and (e) outputting the localized sound binaurally to the crew by a sound-output device.

2. The man-machine interface in claim 1 determining the direction of the detected target from an azimuth angle.

3. The man-machine interface in claim 1 determining the direction of the detected target from an azimuth angle and an elevation angle.

4. The man-machine interface in claim 1 which obtains the direction of the detected target by a detector aboard the aerospace craft.

5. The man-machine interface in claim 1 which obtains the direction of the detected target via a data link system.

6. The man-machine interface in claim 1 which detects the crew's facial direction by performing image processing.

7. The man-machine interface in claim 1 having 30 degrees resolution for an azimuth angle of the detected target with respect to the crew's facial direction.

8. The man-machine interface in claim 1 having 30 degrees resolution for an azimuth angle and an elevation angle of the detected target with respect to the crew's facial direction.

9. The man-machine interface in claim 1 which obtains a scaled-down distance by scaling down a distance from the aerospace craft to the detected target at between 1 to 10,000 and 1 to 1,000 and localizes the sound used as the sound source at the scaled-down distance from a head of the crew.

10. The man-machine interface in claim 1 localizing the sound used as the sound source at a certain distance from a head of the crew, regardless of a distance from the aerospace craft to the detected target.

11. The man-machine interface in claim 10 localizing the sound used as the sound source at the certain distance of between 10 cm and 10 m from the head of the crew.

12. The man-machine interface in claim 1 for localizing the sound used as the sound source in the direction of the detected target with respect to the crew's facial direction and producing the localized sound comprising the steps of:

(a) producing the localized sound by localizing the sound used as the sound source in every direction that a resolution for the direction of the detected target with respect to the crew's facial direction provides;

(b) storing the localized sound in a memory means;

(c) reading out the localized sound from the memory means to produce the localized sound when conveying the direction of the detected target with respect to the crew's facial direction to the crew.

13. The man-machine interface in claim 1 for localizing the sound used as the sound source in the direction of the detected target with respect to the crew's facial direction and producing the localized sound comprising the steps of:

(a) storing the sound used as the sound source in a memory means;

(b) producing the localized sound by localizing the sound used as the sound source by using head related transfer function on the direction of the detected target with respect to the crew's facial direction when conveying the direction of the detected target with respect to the crew's facial direction to the crew.

14. The man-machine interface in claim 1 employing a beep as the sound source.

15. The man-machine interface in claim 1 employing a voice message as the sound source.

16. The man-machine interface in claim 1 employing headphones as the sound-output device.

17. A man-machine interface in a flight simulator for conveying a direction of a detected pseud-target to a crew of the flight simulator by a localized sound comprising the steps of:

(a) obtaining the direction of the detected pseud-target;

(b) detecting a crew's facial direction;

(c) calculating a direction of the detected pseud-target with respect to the crew's facial direction from the direction of the detected pseud-target and the crew's facial direction;

(d) producing the localized sound by localizing a sound used as a sound source in the direction of the detected pseud-target with respect to the crew's facial direction;

(e) outputting the localized sound binaurally to the crew by a sound-output device.

18. The man-machine interface in claim 17 determining the direction of the detected pseud-target from an azimuth angle.

19. The man-machine interface in claim 17 determining the direction of the detected pseud-target from an azimuth angle and an elevation angle.

20. The man-machine interface in claim 17 which detects the crew's facial direction by performing image processing.

21. The man-machine interface in claim 17 having 30 degrees resolution for an azimuth angle of the detected pseud-target with respect to the crew's facial direction.

22. The man-machine interface in claim 17 having 30 degrees resolution for an azimuth angle and an elevation angle of the detected pseud-target with respect to the crew's facial direction.

23. The man-machine interface in claim 17 which obtains a scaled-down distance by scaling down a distance from the aerospace craft to the detected pseud-target at between 1 to 10,000 and 1 to 1,000 and localizes the sound used as the sound source at the scaled-distance from a head of the crew.

24. The man-machine interface in claim 17 localizing the sound used as the sound source at a certain distance from a head of the crew, regardless of a distance from the flight simulator to the detected pseud-target.

25. The man-machine interface in claim 24 localizing the sound used as the sound source at the certain distance of between 10 cm and 10 m from the head of the crew.

26. The man-machine interface in claim 17 for localizing the sound used as the sound source in the direction of the detected pseud-target with respect the crew's facial direction and producing the localized sound comprising the steps of:

(a) producing the localized sound by localizing the sound used as the sound source in every direction that a resolution for the direction of the detected pseud-target with respect to the crew's facial direction provides;

(b) storing the localized sound in a memory means;

(c) reading out the localized sound from the memory means to produce the localized sound when conveying the direction of the detected pseud-target with respect to the crew's facial direction to the crew.

27. The man-machine interface in claim 17 for localizing the sound used as the sound source in the direction of the detected pseud-target with respect to the crew's facial direction and producing the localized sound comprising the steps of:

(a) storing the sound used as the sound source in a memory means;

(b) producing the localized sound by localizing the sound used as the sound source by using head related transfer function on the direction of the detected pseud-target with respect to the crew's facial direction when conveying the direction of the detected pseud-target with respect to the crew's facial direction to the crew.

28. The man-machine interface in claim 17 employing a beep as the sound source.

29. The man-machine interface in claim 17 employing a voice message as the sound source.

30. The man-machine interface in claim 17 employing headphones as the sound-output device.

31. The man-machine interface in claim 17 employing loudspeakers as the sound-output device.

* * * * *